July 7, 1959 — J. J. BOCCHINO — 2,893,516
CHAIN LUBRICATOR
Filed Sept. 6, 1957 — 2 Sheets-Sheet 1
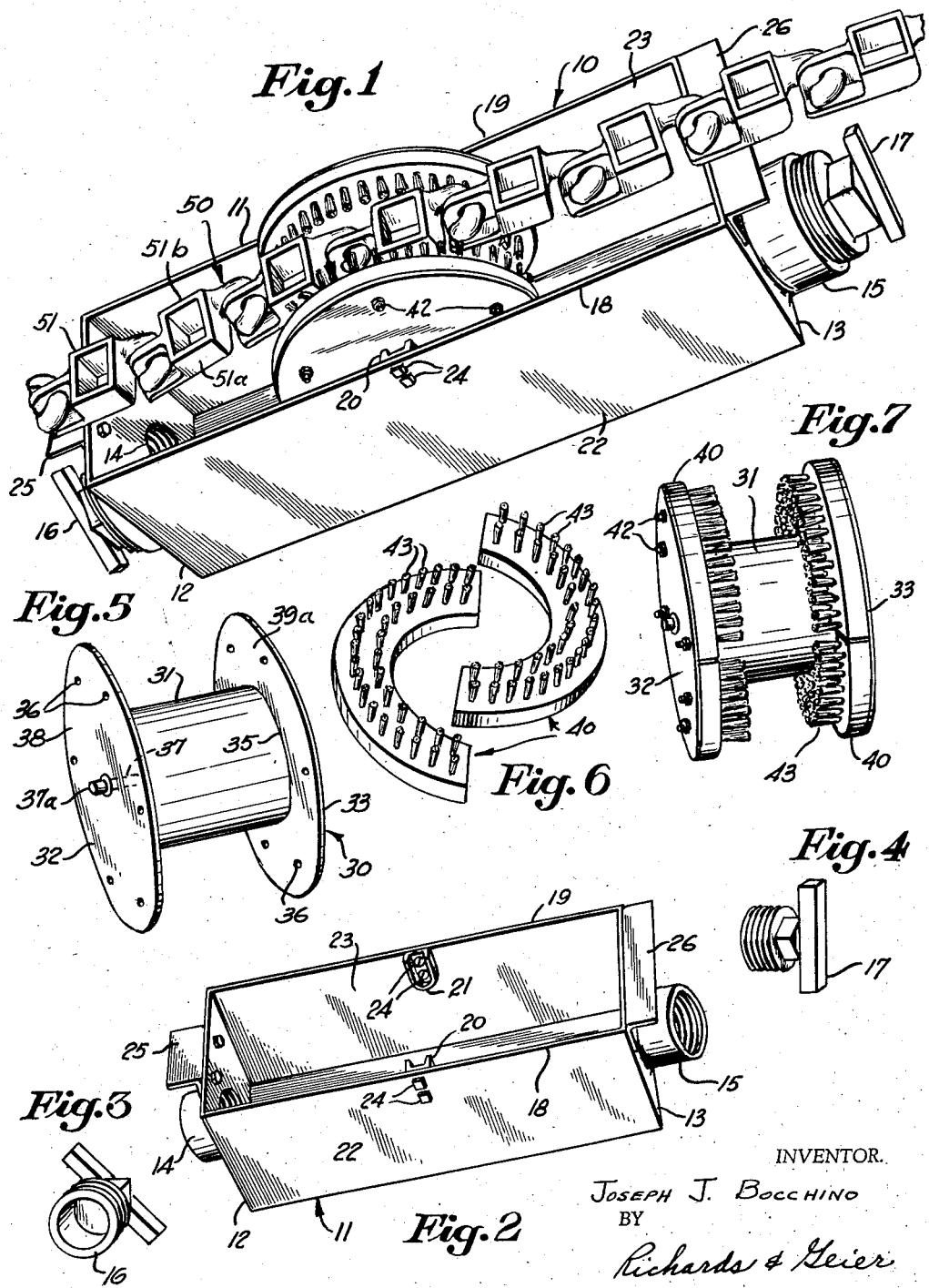
INVENTOR.
JOSEPH J. BOCCHINO
BY
Richards & Geier
ATTORNEYS July 7, 1959　　　J. J. BOCCHINO　　　2,893,516
CHAIN LUBRICATOR Filed Sept. 6, 1957　　　2 Sheets-Sheet 2

INVENTOR.
JOSEPH J. BOCCHINO
BY
Richards & Geier
ATTORNEYS

United States Patent Office 2,893,516
Patented July 7, 1959

2,893,516

CHAIN LUBRICATOR

Joseph J. Bocchino, Rockaway, N.J.

Application September 6, 1957, Serial No. 682,353

1 Claim. (Cl. 184—17)

This invention pertains to an apparatus for lubricating a chain and refers more particularly to a chain lubricating device for a continuously moving chain.

Prior art constructions have not been able to provide satisfactorily a facility for the constant lubrication of a continuously moving chain such as encountered in bottling shops, conveyors, agricultural feed hoppers, hammer mill equipment and the like. Consequently, the chain links became rusted and the friction caused between the underlying support and the movable parts also became readily worn and required frequent overhaul operations. This, therefore, is a costly and major undertaking which interrupts continuous and maximum production efficiency and increases costs of the respective commodity.

It is an object therefore of the present invention to provide a new and improved manner of lubricating a continuously moving chain to effect maximum plant production efficiency.

Another object of the present invention is to provide a chain lubricating device simple in construction and practical in use which may be conveniently installed along the pathway of chain travel.

Yet another object of the present invention is to provide a greater degree of versatility in a chain lubricating apparatus avoiding major problems of installation and maintenance.

Other objects of the present invention will become apparent during the course of the following specification.

In the attainment of the aforesaid objectives, the inventive concept of the present invention may be realized through the provision of a rectangularly formed trough which is provided with inlet and outlet means suitably disposed at each of its opposite ends. A rotatably mounted cylindrical brush holding device having a plurality of bristles on its innermost axial surfaces may be provided at one uppermost portion intermediate its opposite ends. The brush holding device may have diametrically opposed cylindrical discs firmly secured to a cylindrically shaped standard pipe. Coaxially disposed in relation to the standard cylindrical pipe may be firmly secured therein a cylindrical rod or axle substantially smaller in diameter having its opposite ends project outwardly from the axial surfaces of the discs. The ends of the axle may be rotatably mounted within a recessed portion which is firmly disposed intermediate the opposite ends of the rectangularly shaped trough.

The distance between the cylindrical discs may be constituted of any standard width dependent upon the size of the chain to be lubricated.

The chain lubricating device, as will become apparent in greater detail herein, may be further constituted of a plurality of equidistantly spaced orifices provided upon the axial surfaces of each cylindrical shaped brush holding disc.

A nut and bolt may be inserted through each corresponding orifice of the brush holding member coinciding with an orifice of the disc to secure both parts firmly thereto.

The number of bristles that may be positioned upon the inner axial surfaces of each cylindrical disc may also vary. The material of construction is also a matter of preference dependent upon the individual production requirements of operation. The bristles may be randomly spaced or they may be positioned concentrically in rows staggered one behind the other about the axial surfaces of each cylindrical disc.

The overall dimensions of the device constituting the present invention may also be dependent upon the particular size of the trough, the size of the continuous chain, duration of use, etc. Therefore, individual requirements may indicate a larger or smaller chain lubricating apparatus with substantial changes in structural dimensions than those particularly described herein, although the trough and other parts may be of a standard dimension commercially available while others may have custom-made dimensions depending upon individual requirements. The material of construction of the novel chain lubricating device may be preferably made of sheet steel varying in gauge, but preferably constructed of 14-gauge sheet steel. It is understood, however, that any other durable alloy may be conveniently used for purposes of fabricating the device of the present invention.

In the accompanying drawings the chain lubricator has been more or less perspectively shown in several views and detailed only to such extent as to clearly illustrate the important mechanisms of the machine contributing to the method of operation and construction of the novel device as more clearly hereinafter set forth.

The purpose of this method of illustration is to simplify the showing and to eliminate extensive drawings of details and dimensions of installation to a path of chain travel, which are for the most part simple mechanical expedients well known to those skilled in the art.

A fuller understanding of the present invention may be realized by referring to the following description taken in conjunction with the accompanying drawings showing, by way of example, a preferred embodiment of the inventive concept.

In the drawing:

Figure 1 is a perspective view of the novel chain lubricating device showing a preferred embodiment of the assembled construction.

Figure 2 is a perspective view of the rectangularly-shaped lubricating trough.

Figure 3 is a perspective view of one inlet plug.

Figure 4 is a perspective view of another outlet plug.

Figure 5 is a perspective view of a brush holding wheel.

Figure 6 is a perspective view of the brush holder partly in section.

Figure 7 is a perspective view of the assembled brush holder and brush holding wheel.

Figure 8:
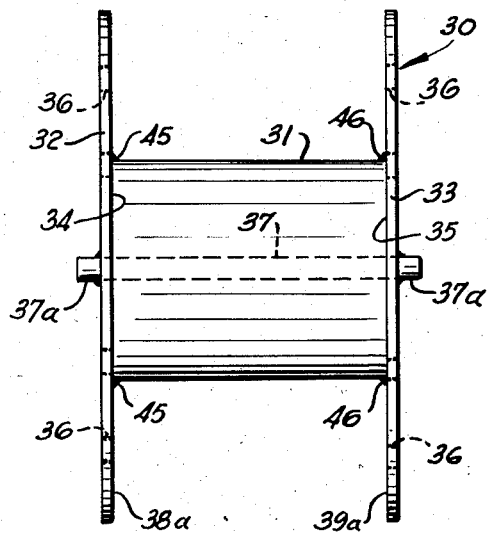
Figure 8 is an elevational view of the brush holding wheel cylindrical pipe and concentrically disposed axle.

Referring now to the drawings in greater detail, wherein like reference numerals indicate like parts, reference numeral 10 indicates the novel chain lubricating device of the present invention.

The chain lubricator 10 is constituted of a rectangularly shaped trough 11 and is provided at each of its opposite ends 12 and 13 with an inlet port 14 and an outlet port 15. A correspondingly shaped inlet plug 16 and outlet plug 17 is adapted to the inlet 14 and outlet port 15 respectively.

The inlet port 14 and the outlet port 15 provide for continuous or intermittent transferal of a lubricant which may be in a semi-solid or liquid form. Along each of one uppermost edge 18 and 19 of the rectangularly shaped trough 11 is a recessed member 20, 21 intermediate the opposite ends 12 and 13 and are firmly secured to the respective adjacent vertical side walls 22 and 23.

The recessed members 20 and 21 are secured by means of bolts 24 to each side of the vertical wall 22 and 23, respectively in such a manner that the recessed members 21 and 22 are firmly positioned to the inner surfaces of the vertical side walls 22 and 23.

At each opposite end 12 and 13 of the shaped trough 11 is provided a leaf support member 25 and 26 which effectively aids in the transition of the linked chain along its line of travel and through each end of the lubricating device 10.

The brush holding wheel 30 as illustrated in Figure 5 is constituted of a cylindrical standard pipe 31 and two cylindrical discs 32 and 33 substantially greater in diameter firmly disposed one at each end 34 and 35 of the pipe 31 thereof. Each cylindrical disc 32 and 33 has a plurality of orifices 36 equi-distantly spaced from each other. Concentrically disposed intermediate the standard cylindrical pipe 31 is an axle 37. The ends 37a of the axle project partially outwardly from each outer axial side surface 38 and 39 of each cylindrical disc 32 and 33 respectively.

Figure 9:
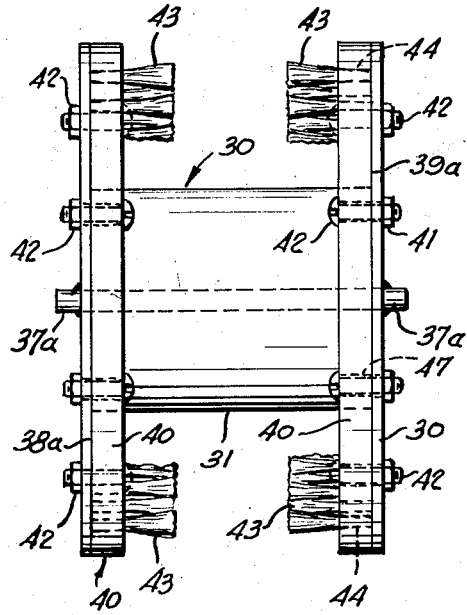
Figure 9 is a front elevational view of the assembled cylindrical wheel and brush holder.
Figure 10:
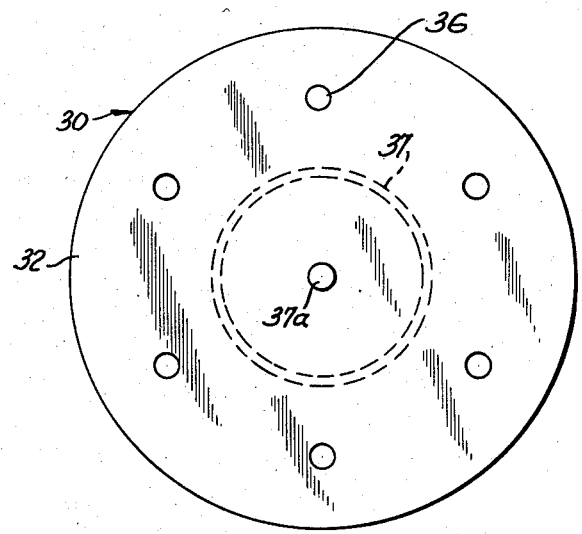
Figure 10 is a side elevational view of the cylindrical wheel.

A circular brush holder ring 40 is firmly fastened to the inner axial surfaces 38a and 39a of each cylindrical disc 32 and 33 by means of nuts and bolts 42 as illustrated in Figure 9. For that purpose each cylindrical brush holding member 40 has a plurality of equi-distantly spaced orifices 47 to correspond with the equi-distantly disposed orifices 36 of the brush holding wheel 30. Each orifice 47 is approximately of the same size as that of each orifice 36 and is aligned thereto so that convenient fastening may be effected by means of the nuts and bolts 42.

Each inner axial surface of the circular brush holder ring 40 is provided with a plurality of evenly disposed bristles 43. The ends of the bristles 43 project outwardly toward each other and are of sufficient length to effectively and frictionally shear the chain link drive which passes therebetween of any contaminants as well as lubricate the chain.

The assembled brush holder 40 and brush holding wheel 30, as shown in Figure 9, is removably and rotatably mounted upon both the recessed members 20 and 21 as illustrated in Figure 1.

It will become apparent from this construction that ease of operation and maintenance is possible. The bristles 43 lubricate the chain links 51 of the chain 50 as it passes through the cylindrical brush holding wheel 30 which rotates by the frictional engagement of the bristles 43 upon the sides 51a and 51b of each chain link 51. The opposite ends of the bristles 43 are firmly secured within cone-shaped orifices 44 within each brush holder 40. It is apparent from this construction that each brush holder 40 may be readily replaced with a new brush holder conveniently upon subsequent wear and tear.

The standard cylindrical pipe 31 is firmly secured to the inner axial surfaces 38a and 39a intermediate the cylindrical discs 32 and 33 by welding or in any other well-known manner.

The chain as shown in Figure 1, continuously moves uni-directionally whereby its entire structure, that is, its top and bottom surfaces of each individual link, is frictionally engaged by means of the bristles 43 disposed on each axial surface of each cylindrical disc 32 and 33. As the chain passes or moves therebetween the brush holding device revolves upon the momentum of the moving chain link drive. The lowermost portion of each cylindrical wheel and brush holder constituting the chain lubricating device is submerged in the lubricating contents disposed within the trough. Under continuous movement of the chain the supply of lubrication to each chain link is constantly applied upon each revolution of the lubricating device.

When the lubricating contents within the trough 11 have been depleted, it is recharged by way of the inlet port 14. Instant change of different lubricants is easily effected by draining the trough 11 by way of outlet port 15.

It thus will be seen that there is provided a novel device herein which achieves the several objects of the present invention aforesaid and is well adapted to meet the conditions of practical and novel use.

Some of the most salient features of the present invention are the adaptability and installational ease with which the device may be embodied to presently existing bottle washing operations, equipment and the like without undergoing major expense.

Another important advantage is the resulting economy of replacement and maintenance with negligible production costs.

It will be understood further that the invention is not limited to the exact disclosure herein described but may lend itself to a variety of expressions in the scope of the appended claim.

What is claimed is:

A lubricator for a continuously moving chain, said lubricator comprising an open trough having elongated side walls and front and rear walls, said front wall having an inlet port and said rear wall having an outlet port formed therein for transferal of lubricant, leaf-shaped supports for the chain, said supports being carried by the upper edges of said front and rear walls and extending substantially perpendicularly thereto in the directions away from the trough, two recessed carrying members, means supporting said recessed members opposite each other upon the inner surfaces of said side walls adjacent to the upper edges thereof, a pipe, two discs firmly connected to opposite ends of said pipe coaxially therewith, said discs having central openings formed therein, an axle extending through said central openings and said pipe and having ends carried by said recessed carrying members, brush holder ring segments, means removably carrying said brush holder ring segments upon opposed inner surfaces of said two discs, and bristles carried by said brush holder ring segments and extending substantially parallel to said axle, the bristles upon the two discs being spaced to provide for the passage of the chain and for engagement of the bristles with the side surfaces of the chain.

References Cited in the file of this patent
UNITED STATES PATENTS

| | | |
|---|---|---|
| 344,134 | Quatermass | June 22, 1886 |
| 1,140,475 | Mulholland | May 25, 1915 |
| 2,548,653 | Cromwell | Apr. 10, 1951 |